(12) United States Patent
Tyni et al.

(10) Patent No.: US 10,252,225 B2
(45) Date of Patent: Apr. 9, 2019

(54) METHOD, APPARATUS AND MIXING DEVICE FOR EVENLY MIXING REACTANT TO EXHAUST GAS FLOW

(71) Applicant: Proventia Oy, Oulunsalo (FI)

(72) Inventors: Tuomas Tyni, Liminka (FI); Sauli Halonen, Oulu (FI); Jukka Kurikka, Liminka (FI)

(73) Assignee: PROVENTIA OY, Oulunsalo (FI)

( * ) Notice: Subject to any disclaimer, the term of this patent is extended or adjusted under 35 U.S.C. 154(b) by 0 days.

(21) Appl. No.: 15/738,430

(22) PCT Filed: Jun. 20, 2016

(86) PCT No.: PCT/FI2016/050446
§ 371 (c)(1),
(2) Date: Dec. 20, 2017

(87) PCT Pub. No.: WO2016/207484
PCT Pub. Date: Dec. 29, 2016

(65) Prior Publication Data
US 2018/0178171 A1    Jun. 28, 2018

(30) Foreign Application Priority Data

Jun. 26, 2015    (GB) .................................. 1511250.1

(51) Int. Cl.
*B01F 3/04*        (2006.01)
*B01D 53/94*     (2006.01)
(Continued)

(52) U.S. Cl.
CPC ...... *B01F 3/04049* (2013.01); *B01D 53/9418* (2013.01); *B01D 53/9477* (2013.01);
(Continued)

(58) Field of Classification Search
CPC ........ B01D 53/34; B01D 53/38; B01D 53/74; B01D 53/76; B01D 53/92; B01D 53/94;
(Continued)

(56) References Cited

U.S. PATENT DOCUMENTS 9,567,218 B2 * 2/2017 Wu .......................... B01J 15/005
9,604,170 B2 * 3/2017 Kimura ................. B01F 5/0065
(Continued)

FOREIGN PATENT DOCUMENTS

DE      24 34 798 A1 *  1/1976  ............ B01F 5/0615
EP       0 947 239 B1 *  6/2005  ............ B01F 5/0682
(Continued)

OTHER PUBLICATIONS

GB Intellectual Property Office, Combined Search and Examination Report under Sections 17 and 18(3), Application No. GB1511250.1, dated Dec. 15, 2015, 8 pages.
(Continued)

*Primary Examiner* — Timothy C Vanoy
(74) *Attorney, Agent, or Firm* — Ziegler IP Law Group, LLC

(57) ABSTRACT

An apparatus for aftertreatment of exhaust gas includes a housing configured to define an inner cavity; an exhaust inlet arranged to the housing for entering exhaust gas flow to the inner cavity; a mixer unit arranged in the inner cavity to dispense a reactant to the exhaust gas flow; a mixing device, located downstream of the mixer unit, to evenly mix the reactant to the exhaust gas flow. The mixing device includes: a toroidal cylinder to receive the exhaust gas flow from the mixer unit via a solid tubular element, wherein the solid tubular element is in a centric manner to a first base of the toroidal cylinder for guiding the exhaust gas flow led into the toroidal cylinder to swirl inside the toroidal cylinder; and an exhaust outlet arranged to a curved side of the toroidal
(Continued)

cylinder, to exit the exhaust gas flow from the mixing device.

22 Claims, 8 Drawing Sheets

(51) Int. Cl.
    *B01F 5/00*         (2006.01)
    *B01F 5/02*         (2006.01)
    *B01F 5/04*         (2006.01)
    *F01N 13/00*       (2010.01)
    *F01N 3/20*         (2006.01)
    *F01N 3/021*       (2006.01)

(52) U.S. Cl.
    CPC .......... *B01F 5/0065* (2013.01); *B01F 5/0268* (2013.01); *B01F 5/0451* (2013.01); *F01N 3/021* (2013.01); *F01N 3/2066* (2013.01); *F01N 13/009* (2014.06); *B01F 2005/0017* (2013.01); *F01N 2610/02* (2013.01)

(58) Field of Classification Search
    CPC ........... B01D 2258/01; B01D 2258/012; B01J 15/00; B01J 15/005; B01J 19/2415; B01J 19/2455; F01N 3/038; F01N 2470/02; F01N 2470/08; B01F 5/06
    See application file for complete search history.

(56) References Cited

U.S. PATENT DOCUMENTS

2007/0104622 A1*   5/2007   Zuberi ............... B01D 46/0012
                                                                                     422/177
2011/0308234 A1*  12/2011   De Rudder ......... B01F 3/04049
                                                                                       60/295
2012/0103719 A1*   5/2012   Mead ..................... F01N 1/085
                                                                                       181/228
2014/0230411 A1    8/2014   De Rudder et al.
2015/0167520 A1*   6/2015   Niaz ..................... F01N 3/2892
                                                                                       422/310
2016/0069240 A1*   3/2016   Noma ..................... F01N 3/035
                                                                                      422/105
2016/0115848 A1*   4/2016   Kurikka ............... B01F 5/0065
                                                                                      422/180
2016/0121275 A1*   5/2016   De Rudder ........... F01N 3/2066
                                                                                      422/169
2016/0184783 A1*   6/2016   Tyni ..................... B01F 5/0065
                                                                                      422/169
2016/0265409 A1*   9/2016   Puschel ................. B01D 53/94

FOREIGN PATENT DOCUMENTS

| EP | 2128398 A1 | 12/2009 |
| --- | --- | --- |
| EP | 2395211 A1 | 12/2011 |
| EP | 2803833 A1 | 11/2014 |
| WO | 2013152384 A1 | 10/2013 |
| WO | 2015071233 A1 | 5/2015 |
| WO | 2015105500 A1 | 7/2015 |

OTHER PUBLICATIONS

The International Search Report and Written Opinions of the International Searching Authority, Application No. PCT/FI2016/050446, dated Oct. 12, 2016, 14 pages.

* cited by examiner

METHOD, APPARATUS AND MIXING DEVICE FOR EVENLY MIXING REACTANT TO EXHAUST GAS FLOW

TECHNICAL FIELD

The present application generally relates to a mixing device, method and apparatus for aftertreatment of exhaust gas.

BACKGROUND ART

This section illustrates useful background information without admission of any technique described herein representative of the state of the art.

Emission regulations for internal combustion engines have tightened over recent years, and the trend is even tightening. For example, regulated emissions of NOx and particles from internal combustion engines are becoming so low that the target emissions levels are hard to be met. Therefore, aftertreatment systems are used in engines to reduce emissions. For reducing NOx emissions, NOx reduction catalysts, including selective catalytic reduction (SCR) systems, are utilized to convert NOx (NO and NO2) to N2 and other compounds. SCR systems utilize a reactant, such as ammonia, to reduce the NOx.

Simultaneously with the emission regulation demands, also power and efficiency demands for engines increase. On top of that the internal combustion engines should be designed and manufactured with smaller size and decreased weight, if possible.

A solution is needed for cost-efficiently providing an aftertreatment system of exhaust gas for internal combustion engine to reduce emissions capable of fulfilling the requirements for emission regulations without sacrificing too much power and efficiency of the engine. Furthermore, an improved solution is needed to reduce the size and the length of the exhaust gas ducts needed for the aftertreatment system.

SUMMARY

According to a first example aspect of the present disclosure there is provided an apparatus for aftertreatment of exhaust gas comprising:

a housing configured to define an inner cavity;

an exhaust inlet arranged to the housing for entering exhaust gas flow to the inner cavity;

a mixer unit arranged in the inner cavity configured to dispense a reactant to the exhaust gas flow, wherein the mixer unit further comprising a perforated tubular element configured to assist the exhaust gas flow to circulating and advancing movement in a first direction within the inner cavity, wherein at least part of the exhaust gas flow is configured to enter an interior of the perforated tubular element through apertures;

a first curved flow guide and a second curved flow guide in the inner cavity for steering the entering exhaust gas flow in the inner cavity to form a first flow path and a second flow path from the exhaust inlet circulating the perforated tubular element, wherein the first flow path comprises:

a first part between an outer wall of the first curved flow guide and an inner wall of the housing configured to define the inner cavity;

a second part between the inner wall of the housing configured to define the inner cavity and the perforated tubular element; and a third part between an inner wall of the second curved flow guide and the perforated tubular element; and the second flow path comprises:

a first part between an outer wall of the second curved flow guide and an inner wall of the first curved flow guide;

a second part between the inner wall of the first curved flow guide and the perforated tubular element;

a third part between the inner wall of the housing configured to define the inner cavity and the perforated tubular element; and a fourth part between an inner wall of the second curved flow guide and the perforated tubular element.

In an embodiment, the apparatus further comprises at least one of the following:

a diesel particulate filter (DPF) for receiving exhaust gas, located upstream of the mixer unit; and a selective catalytic reduction (SCR) substrate, located downstream of the mixing device.

In an embodiment, the apparatus further comprises a mixing device, located downstream of the mixer unit, configured to evenly mix the reactant to the exhaust gas flow, the mixing device comprising a toroidal cylinder configured to receive the exhaust gas flow from the mixer unit via a solid tubular element, wherein the solid tubular element being arranged in a centric manner to a first base of the toroidal cylinder for guiding the exhaust gas flow led into the toroidal cylinder to swirl inside the toroidal cylinder; and an exhaust outlet arranged to a curved side of the toroidal cylinder, configured to exit the exhaust gas flow from the mixing device. A width from the first base to a second base of the toroidal cylinder may be smaller than a diameter of the toroidal cylinder. The second base of the toroidal cylinder may be bent inwards.

In an embodiment, a diameter of the exhaust outlet is equal to the maximum width from the first base to the second base of the toroidal cylinder.

In an embodiment, the solid tubular element is configured to guide the exhaust gas into the toroidal cylinder in a horizontal direction and the exhaust outlet is configured to exit the exhaust gas flow from the mixing device in a vertical direction. The solid tubular element may guiding the exhaust gas into the toroidal cylinder may be configured to extend partially inside the toroidal cylinder.

In an embodiment, the mixer unit further comprises the solid tubular element located downstream to the perforated tubular element and configured to guide the circulating and advancing exhaust gas flow in the first direction towards the mixing device, wherein a diameter of the solid tubular element being greater than a diameter of a downstream end of the perforated tubular element allowing a part of the circulating and advancing exhaust gas flow around the perforated tubular element to enter the solid tubular element.

In an embodiment, the first curved flow guide extends from the exhaust inlet in the inner cavity to a first direction around the perforated tubular element; and the second curved flow guide extends from the exhaust inlet in the inner cavity to a second direction around the perforated tubular element; and wherein upstream ends of the first curved flow guide and the second curved flow guide adjacent to the exhaust inlet are at least partially overlapping to provide a gap between the curved flow guides for the first part of the second flow path.

In an embodiment, the second curved flow guide is longer than the first curved flow guide.

In an embodiment, an upstream end of the second curved flow guide is adjacent to the exhaust inlet and a downstream end of the second curved flow guide is connected to the inner wall of the housing configured to define the inner cavity.

According to a second example aspect of the present disclosure there is provided a method for aftertreatment of exhaust gas comprising:

receiving exhaust gas flow to an inner cavity of a housing via an exhaust inlet;

dispensing a reactant to the exhaust gas flow by a mixer unit arranged in the inner cavity, wherein the mixer unit further comprising a perforated tubular element configured to assist the exhaust gas flow to circulating and advancing movement in a first direction within the inner cavity, wherein at least part of the exhaust gas flow is configured to enter an interior of the perforated tubular element through apertures;

guiding by a first curved flow guide and a second curved flow guide in the inner cavity for steering the entering exhaust gas flow in the inner cavity to form a first flow path and a second flow path from the exhaust inlet circulating the perforated tubular element, wherein the first flow path comprises: a first part between an outer wall of the first curved flow guide and an inner wall of the housing configured to define the inner cavity; a second part between the inner wall of the housing configured to define the inner cavity and the perforated tubular element; and a third part between an inner wall of the second curved flow guide and the perforated tubular element; and the second flow path comprises: a first part between an outer wall of the second curved flow guide and an inner wall of the first curved flow guide; a second part between the inner wall of the first curved flow guide and the perforated tubular element; a third part between the inner wall of the housing configured to define the inner cavity and the perforated tubular element; and a fourth part between an inner wall of the second curved flow guide and the perforated tubular element.

According to a third example aspect of the present disclosure there is provided a mixing device, located downstream of a mixer unit, configured to evenly mix a reactant to an exhaust gas flow; wherein the mixing device comprising:

a toroidal cylinder configured to receive the exhaust gas flow from the mixer unit via a solid tubular element, wherein the solid tubular element being arranged in a centric manner to a first base of the toroidal cylinder for guiding the exhaust gas flow led into the toroidal cylinder to swirl inside the toroidal cylinder; and an exhaust outlet arranged to a curved side of the toroidal cylinder, configured to exit the exhaust gas flow from the mixing device.

In an embodiment, a width from the first base to a second base of the toroidal cylinder is smaller than a diameter of the toroidal cylinder.

In an embodiment, the second base of the toroidal cylinder is bent inwards.

In an embodiment, a diameter of the exhaust outlet being equal to the maximum width from the first base to the second base of the toroidal cylinder.

In an embodiment, the solid tubular element is configured to guide the exhaust gas into the toroidal cylinder in a horizontal direction and the exhaust outlet is configured to exit the exhaust gas flow from the mixing device in a vertical direction.

In an embodiment, the solid tubular element guiding the exhaust gas into the toroidal cylinder is configured to extend partially inside the toroidal cylinder.

In an embodiment, the toroidal cylinder comprising a poloidal angle configured to cause the toroidal cylinder to have a poloidal round shape.

In an embodiment, the toroidal cylinder comprising no poloidal angle to cause the toroidal cylinder to have an annular ring shape.

In an embodiment, the toroidal cylinder comprising a further flow guide within an inner cavity of the toroidal cylinder.

In an embodiment, the further flow guide comprising a solid cup-shaped flow guide configured to extend a flow path of the exhaust gas flow. The exhaust gas flow may be configured to swirl inside the solid cup-shaped flow guide until exiting the solid cup-shaped flow guide through a gap between an open end of the solid cup-shaped flow guide and the solid tubular element. After exiting the solid cup-shaped flow guide, the exhaust gas flow may be configured to swirl inside the toroidal cylinder before exiting from the mixing device via the exhaust outlet.

In an embodiment, the further flow guide comprising a perforated tubular flow guide configured to extend a flow path of the exhaust gas flow and to improve mixing of the exhaust gas with the reactant. The exhaust gas flow may be configured to swirl inside the perforated tubular flow guide until exiting the perforated tubular flow guide through a gap between the open end of the perforated tubular flow guide and the solid tubular element or through holes of the perforated tubular flow guide. After exiting the perforated tubular flow guide, the exhaust gas flow may be configured to swirl inside the toroidal cylinder before exiting from the mixing device via the exhaust outlet.

Different non-binding example aspects and embodiments of the present invention have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

The disclosed embodiments will be described, by way of example only, with reference to the accompanying drawings, in which.

DETAILED DESCRIPTION

In the following description, like reference signs denote like parts or steps.

Figure 1:
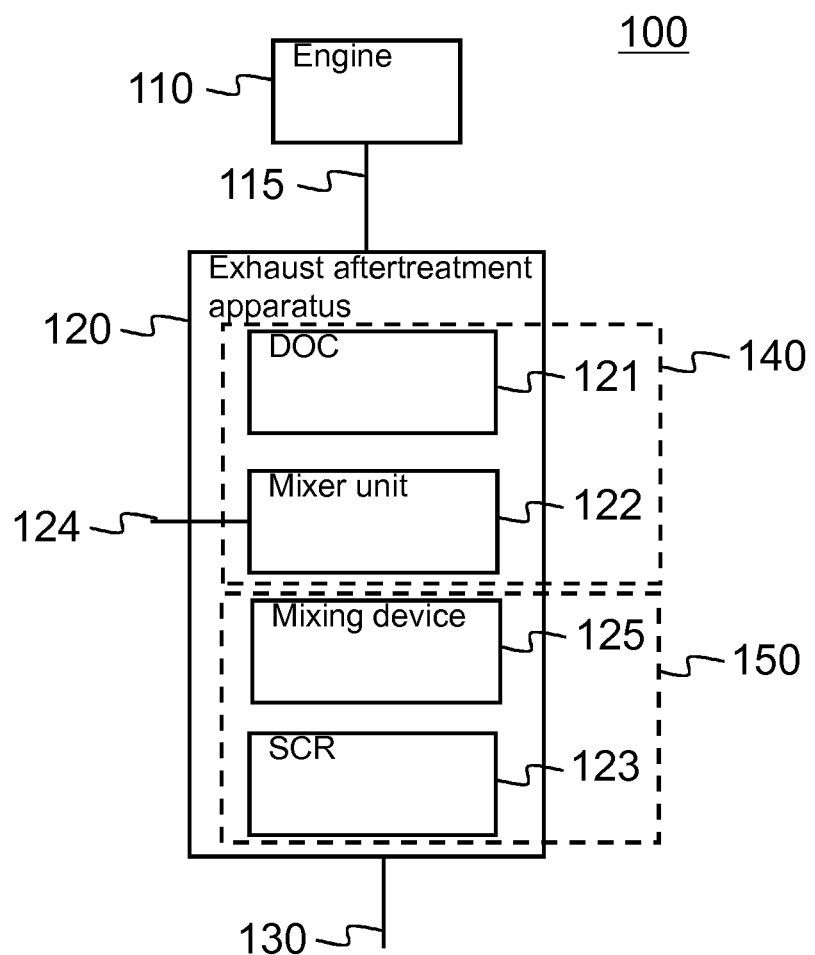
FIG. 1 shows a schematic picture of a system according to an example embodiment of the present disclosure.

FIG. 1 shows a schematic picture of a system according to an example embodiment of the invention. An engine system 100 is shown. The engine system 100 comprises an engine 110 and an exhaust aftertreatment apparatus 120. Furthermore, the system 100 may comprise other devices that are not shown in the FIG. 1. Such devices comprise, for example, fuel storage for the engine 110 (e.g. diesel), and an air intake device including an air filter.

FIG. 1 shows a connection 115 between the engine 110 and the exhaust aftertreatment apparatus 120. The connection 115 may comprise a pipe for guiding exhaust gas from the engine 110, for example.

The exhaust aftertreatment apparatus 120 receives the exhaust gas from the engine 110 over the connection 115. In an embodiment, the apparatus 120 comprises a catalytic converter, such as diesel oxidation catalyst (DOC) device 121, a mixer unit 122, a mixing device 125 and a selective catalytic reduction (SCR) device 123. The devices 121-125 are in an embodiment implemented within the same housing of the apparatus 120 but at least one of the devices 121-125 may also be placed outside the housing of the apparatus 120. In another embodiment, any of the devices 121-125 may be implemented within different housings. For example, the DOC 121 and the mixer unit 122 may be implemented within the same housing, and the mixing device 125 and the SCR 123 within another housing. In another embodiment, the mixer unit 122 and the mixing device 125 are implemented within the same housing. In still another embodiment, all devices 121-125 may be implemented within different housings. A connection 124 for receiving reactant for the mixer unit 122 is also disclosed. The apparatus 120 may further comprise devices not shown in FIG. 1, such as doser for the reactant, storage for the reactant (such as urea or ammonia), gas flow guides and connections within the apparatus 120 and within its devices 121-125.

Catalytic converters (diesel oxidation catalysts or DOC's) 121 are typically used in an exhaust system to convert undesirable gases such as carbon monoxide and hydrocarbons from engine's exhaust into carbon dioxide and water. DOC's may have different configurations. The substrates used in catalytic converters preferably include a catalyst.

A diesel particulate filter (DPF) may also be implemented together or alternatively to the DOC 121 in an exhaust system to remove particulate matter (e.g., carbon based particulate matter such as soot) from the exhaust. DPF's can have a variety of known configurations.

The selective catalytic reduction (SCR) catalyst device 123 is typically used in an exhaust system to remove undesirable gases such as nitrogen oxides (NOx) from the engine's emissions. SCR's are capable of converting NOx to nitrogen and oxygen in an oxygen rich environment with the assistance of reactants such as urea or ammonia, which are injected into the exhaust gas upstream of the SCR device 123.

A mixer unit 122 is configured to receive exhaust gas from the engine 110 over connection 115, which gas is possibly run through a DOC 121 or a DPF, as disclosed above. The mixer unit 122 receives also reactant, such as diesel exhaust fluid (DEF), over the connection 124, the reactant commonly referred to as AdBlue that is an aqueous urea solution made with 32.5% high-purity urea and 67.5% deionized water. DEF may be used as a consumable in selective catalytic reduction (SCR) in order to lower NOx concentration in the diesel exhaust emissions from diesel engines. The mixer unit 122 is configured to dispense the reactant to the exhaust gas and start mixing them.

The even mixing is carried on by the mixing device 125 and also targeting to reduce urea deposits in exhaust pipelines. When SCR process uses DEF, it can cause urea deposits in exhaust pipes, especially in off-road applications using airless DEF injectors. Larger DEF spray droplets might lead to wall wetting and film formation on exhaust pipe inner surfaces, causing deposits when the local temperatures are low. Urea deposit problems have become frequent and critical, and the mixer unit 122 together with the mixing device 125 are configured to keep pipelines clean by evenly distributing the reactant to the exhaust gas in the shortest possible pipe length and avoiding this way the wall wetting and film formation. The mixing device 125 is especially advantageous to reduce the pipe length needed for mixing to achieve evenly enough mixing of the reactant and the exhaust gas before reaching the SCR. Thus not only the pipe length needed, but also the overall size of the aftertreatment system, is reduced. Especially width of the exhaust aftertreatment apparatus may be critical.

The apparatus 120 may also help water evaporation from DEF and ensures optimal reactions with the reactant with no unwanted side effects. The apparatus 120 may be used with all reactant dosers (e.g. urea or ammonia) to achieve even NH3 distribution within the exhaust gas. Further benefit is experienced with airless injectors, which have rather large Sauter mean diameter (SMD) and when the injection must start at low temperatures. An exhaust gas outlet pipe 130 guides the aftertreated exhaust gas from the apparatus 120.

In an embodiment, the apparatus 120 is configured to inject small droplets of reactant, such as urea-water solution, to the exhaust gas flow and causing the reactant to vaporize in an exhaust gas flow channel defined by the mixer unit and the mixing device and to react with the nitric oxides of the exhaust gas and changing them to plain nitrogen. Such final change to nitrogen takes place in SCR catalysator 123.

In an embodiment, an exhaust gas cleaning unit is arrangeable to an exhaust gas channel, which unit comprises an inlet duct 115 for the inflow of exhaust gas to be cleaned and an outlet duct 130 for the outflow of exhaust gas. Between the inlet duct 115 and the outlet duct 130 is a first housing part 140 that comprises a DOC-substrate 121 (Diesel Oxidation Catalyst) and a second housing part 150 that comprises a SCR catalysator 123. The housing parts may also comprise other devices for cleaning exhaust gas, such as a particle filter, (Diesel Particulate Filter).

Inside the second housing part 150 there are the mixing device 125 that provides even mixing of the exhaust gas and the reactant with reduced size and length of the apparatus 120, and possibly a SCR 123.

As is shown in following figures and description, some elements of FIG. 1 are not mandatory for the apparatus 120, such as DOC 121 and SCR 123.

Figure 2:
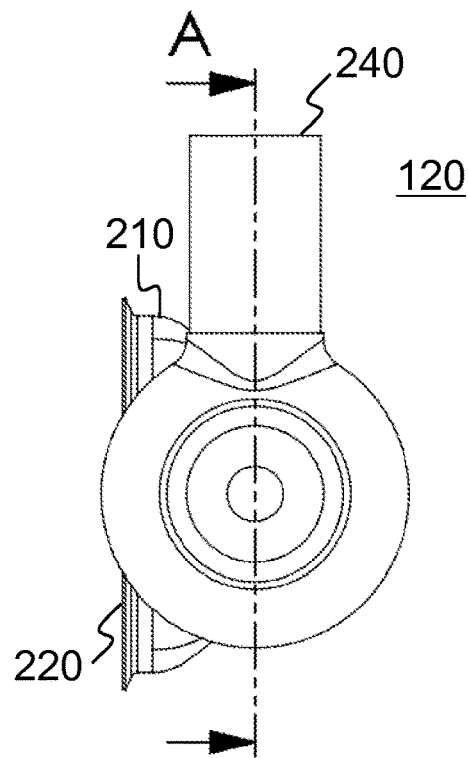
FIG. 2 shows a schematic picture of an apparatus according to an example embodiment of the present disclosure illustrating the cross-sectional view A-A.

FIG. 2 shows a schematic picture of an exhaust gas aftertreatment apparatus 120 according to an example embodiment of the present disclosure. The apparatus 120 for aftertreatment of exhaust gas is viewed from a side and comprises a housing 210, an exhaust inlet 220, a reactant inlet (not shown), and an exhaust outlet 240.

In an embodiment, the reactant inlet comprises a nozzle (not shown).

The exhaust inlet 220 is arranged to the housing 210 for entering input exhaust gas to the apparatus 120. The reactant inlet is arranged to the housing 210 for dispensing reactant to the apparatus 120, and the reactant is configured to mix with the input exhaust gas to provide mixed exhaust gas. The exhaust outlet 240 is arranged to the housing 210 for exiting output exhaust gas from the apparatus 120. Furthermore, the apparatus 120 may comprise, for example, attachment elements for attaching the apparatus 120 to an engine system or a chassis of a vehicle. The exhaust outlet 240 may comprise an outlet duct. Plane A-A illustrates cross-sectional view used for FIG. 3.

In an embodiment, a diesel oxidation catalyst (DOC) substrate (not shown) is placed downstream to the exhaust inlet 220, and upstream to the reactant inlet 230.

In an embodiment, a selective catalytic reduction (SCR) substrate (not shown) is placed downstream to the reactant inlet 230, the mixer unit 250, and the mixing device 260.

In an embodiment, the SCR substrate may also comprise a diesel particulate filter (DPF) for particulate matter reduction.

Figure 3:
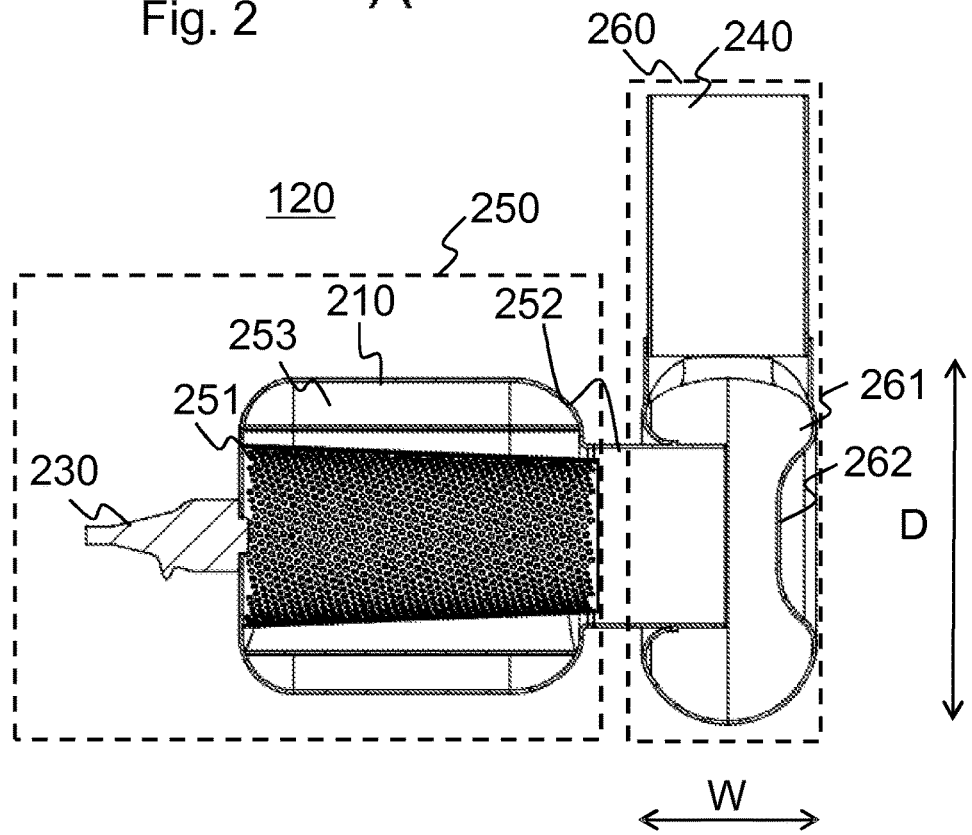
FIG. 3 shows a schematic picture of an exhaust gas aftertreatment apparatus according to an example embodiment of the present disclosure illustrating the plane A-A.

FIG. 3 shows a schematic picture of an exhaust gas aftertreatment apparatus 120 according to an example embodiment of the invention illustrating the cross-sectional view A-A.

The reactant inlet 230 is arranged to the housing 210 for dispensing reactant to the apparatus 120, and the reactant is configured to mix with the input exhaust gas to provide mixed exhaust gas.

In an embodiment, the apparatus 120 comprises a mixer unit 250 and a mixing device 260, as illustrated using dashed lines. The mixing device 260, located downstream to the mixer unit 250, receives the exhaust gas mixed with the reactant, and provides evenly mixing of those with reduced apparatus 120 size, especially the width from the reactant inlet 230 to the opposite end wall of the mixing device 260. A solid tubular element, 252 may be provided to connect the mixer unit 250 and the mixing device 260. The solid tubular element 252 may be regarded to belong to either of the mixer unit 250 or the mixing device 260, or both.

In an embodiment, a housing 210 is configured to define at least one inner cavity, wherein the exhaust gas is aftertreated by the apparatus 120. An exhaust inlet 220 is arranged to the housing 210 for entering input exhaust gas for the inner cavity. The exhaust gas may travel through DOC substrate within the inner cavity before reaching a mixer unit 250.

In an embodiment, the apparatus further comprises a perforated tubular element 251, wherein at least part of the input exhaust is configured to enter an interior of the perforated tubular element through apertures. The perforated tubular element 251 is configured to assist the exhaust gas to circulating and advancing movement in a horizontal direction within the inner cavity of the mixer unit 250 towards the mixing device 260. The reactant is configured to mix with the input exhaust gas when circulating and advancing. The circulating and advancing movement of the mixed exhaust gas may take place both inside the perforated tubular element 251 and outside the perforated tubular element 251.

In an embodiment, the perforated tubular element may have different shapes, such as cylindrical or conical. As can be seen, the perforated tubular element of FIG. 3 is conical.

From the mixer unit 250, the mixed exhaust gas is guided to the mixing device 260, where more evenly mixed exhaust gas is achieved. A solid tubular element 252 between the mixer unit 250 and the mixing device 260 may be used. Alternatively, the devices 250, 260 may be connected directly with each other, for example.

In an embodiment, an apparatus 120 for aftertreatment of exhaust gas comprises a housing 210 configured to define an inner cavity 262, an exhaust inlet 220 arranged to the housing for entering exhaust gas flow to the inner cavity, a mixer unit 230, 251, 252, 250 arranged in the inner cavity configured to dispense a reactant to the exhaust gas flow, and a mixing device 260, located downstream of the mixer unit, configured to evenly mix the reactant to the exhaust gas flow. The mixing device 260 comprises a toroidal cylinder 261 configured to receive the exhaust gas flow from the mixer unit via a solid tubular element 252, wherein the solid tubular element being arranged in a centric manner to a first base of the toroidal cylinder for guiding the exhaust gas flow led into the toroidal cylinder to swirl inside the toroidal cylinder; and an exhaust outlet 240 arranged to a curved side of the toroidal cylinder, configured to exit the exhaust gas flow from the mixing device.

In an embodiment, a mixing device 260 is located downstream of a mixer unit 250, configured to evenly mix a reactant to an exhaust gas flow, wherein the mixing device comprises a toroidal cylinder 261 configured to receive the exhaust gas flow from the mixer unit via a solid tubular element, wherein the solid tubular element is arranged in a centric manner to a first base of the toroidal cylinder 261 for guiding the exhaust gas flow led into the toroidal cylinder to swirl inside the toroidal cylinder; and an exhaust outlet 240 arranged to a curved side of the toroidal cylinder, configured to exit the exhaust gas flow from the mixing device.

In an embodiment, a width W from the first base to a second base of the toroidal cylinder 261 is smaller than a diameter D of the toroidal cylinder 261. At least one of the first or the second base of the toroidal cylinder may be bent inwards to improve the performance of the mixing device.

As can be seen in FIG. 3, a diameter of the exhaust outlet 240 may be arranged to be equal to the maximum width W from the first base to the second base of the toroidal cylinder.

The solid tubular element 252 is configured to guide the exhaust gas flow into the toroidal cylinder 261 in a horizontal direction and the exhaust outlet 240 is configured to exit the exhaust gas flow from the mixing device 260 in a vertical direction.

In an embodiment, the solid tubular element 252 guiding the exhaust gas flow into the toroidal cylinder 261 may be configured to extend partially inside the toroidal cylinder. In FIG. 3, the solid tubular element 252 extends to the middle of the toroidal cylinder 261.

In an embodiment, a perforated tubular element 251 of a mixer unit 250 is configured to assist an exhaust gas flow to circulating and advancing movement in a first direction within the inner cavity, wherein at least part of the exhaust gas flow is configured to enter an interior of the perforated tubular element through apertures.

In an embodiment, the mixer unit 250 further comprises the solid tubular element 252 located downstream to the perforated tubular element 251 and configured to guide the circulating and advancing exhaust gas flow in the first direction towards the mixing device 260, wherein a diameter of the solid tubular element 252 being greater than a diameter of a downstream end of the perforated tubular element 251 as shown in FIG. 3, allowing a part of the circulating and advancing exhaust gas flow around the perforated tubular element 251 to enter the solid tubular element 252.

In an embodiment, the solid tubular element 252 may correspond to a connection pipe between a first housing part (mixer unit 250) of the apparatus housing 210 and a second housing part (mixing device 260) of the housing 210 defining inner cavity 253.

In an embodiment, a second base 262 of the toroidal cylinder 261 is flat or concave. As shown in FIG. 3, the second base 262 is concave and directing inwards in the middle of the base 262. The concave shape eases the turning of the direction of the exhaust gas flow from the horizontal direction from the mixer unit 250 to the second direction around the toroidal cylinder 261 of the mixing device 260. Also the circulating component of the exhaust gas flow eases the turning of the flow. Thus the counter pressure caused by the turning is reduced.

The exhaust gas flow mixed with the reactant is configured to travel first to the horizontal direction parallel to a center axis of the perforated tubular element 251 circulating and advancing, then swirling within the toroidal cylinder 261 and evenly mixing, and after that exiting the mixing device 260 and the inner cavity 253 to a vertical direction via an exhaust outlet 240.

In an embodiment, the reactant inlet 230 is configured to dispense a reactant into the interior of the perforated tubular element 251 to the first direction from a first end of the perforated tubular element towards a second end of the perforated tubular element 251.

In an embodiment, the first end of the perforated tubular element 251 may be attached to the inside surface of the housing 210. Alternatively, the first end may be separated from the inside surface of the housing 210 with a small gap, through which some exhaust gas may be passed to the interior of the perforated tubular element 251 from an open first end of the element 251.

In an embodiment, an exhaust gas cleaning unit is arrangeable to an exhaust gas channel, which unit comprises an inlet duct for the inflow of exhaust gas to be cleaned and an outlet duct for the outflow of exhaust gas. Between the inlet duct and the outlet duct is a first housing part that comprises a mixer unit 250 and a second housing part that comprises a mixing device 260. The housing parts may also comprise other devices for cleaning exhaust gas, such as a particle filter, (Diesel Particulate Filter), a DOC-substrate (Diesel Oxidation Catalyst) and a SCR catalysator. Different housing parts may be connected by a connection pipe 252. Inside the first housing part there is a swirl structure comprising a tubular feeding element 251 and flow guides arranged around the tubular feeding element. In a wall of the first housing there is a nozzle hole for a nozzle 230 that is used for injecting urea-water solution to the exhaust gas flowing in the tubular feeding element 251. With the help of the swirl structure, the exhaust gas passed through the DOC-substrate is divided to a central flow flowing inside the tubular feeding element 251 and an edge flow surrounding the tubular feeding element. These flows are guided out from a first housing part to the connection pipe 252, wherein the flows are combined to an advancing exhaust gas flow that circulates around the central axis of the connection pipe.

In an embodiment, the exhaust gas flow is guided to the solid tubular element 252. The exhaust gas flow is arranged to a circulating and advancing flow using the mixer unit 250 that locates upstream to the element 252. The exhaust gas flow thus has a rotating component when it advances through the element 252. Between the downstream end of the solid tubular element 252 and the second base 262 of the toroidal cylinder 261, the direction of the exhaust gas flow is changed to swirl within the toroidal cylinder 261. Changing the exhaust gas flow direction the length of the exhaust gas flow path may be increased and thus the water-urea solution has more time to mix with the exhaust gas flow and evaporate. The rotating component of the gas flow and the shape of the base 262 ease the changing of the flow direction and reduce counter pressure caused by the turning.

The size, especially length, of the exhaust gas aftertreatment apparatus may be decreased by utilizing the different directions of the exhaust gas flow within the apparatus. Furthermore, the counter pressure caused by the different gas flow directions is minimal. Reactant is better mixed with the exhaust gas with the described apparatus and vaporized more quickly. Thus, the amount of deposit generated to the inner wall of the exhaust gas channel is reduced.

In an embodiment, a perforated tubular element 251 reduces turbulence of an exhaust gas entering the interior of the perforated tubular element 251. The exhaust gas entering the interior of the perforated tubular element 251 forms a center flow, wherein the reactive substance is fed by the reactant inlet 230. Reducing the turbulence in the interior of the perforated tubular element 251 results in that the center flow and the edge flow remain apart from each other in the beginning of a mixing procedure, whereby the reactive substance fed into the center flow does not come into contact with a wall of the inner cavity 253 before it is converted to ammonia, for example.

The perforated tubular element 251 reduces formation of solid deposit generated in the conversion process of urea (or some other reactant) in the inner cavity 253 and thus reduces the service need of the apparatus and the engine system. Furthermore, the engine system retains its operational ability and efficiency better.

In an embodiment, not only the size of the mixing apparatus 120 may be reduced but also the shape may be more freely designed. Since the deposit risk of the urea also in the bends of the housing 210 is reduced, the designing of the aftertreatment apparatus 120 becomes easier. The width W added by a mixing device 260 can be reduced by using the toroidal cylinder 261, compared to the state of the art mixing apparatuses. Such width reduction may be crucial when placing the mixing apparatus 120 to an engine system with limited space. Additionally, the shape of the toroidal cylinder 261 enables directing of the exhaust outlet 240 freely to any direction from the side of the toroidal cylinder 261. Furthermore, an angle of the exhaust outlet 240 in view of a diameter axis of the cylinder 261 may be adjusted to further improve the flexible design of the apparatus 120. Thus the outlet 240 needs not to be directed vertically compared to the horizontal mixer unit 250 (perforated tubular element 251 and solid tubular element 252).

In an embodiment, a first flow guide 210 in the inner cavity 253 is configured to guide at least part of the exhaust gas flow to a first direction to form a first direction flow. A reactant inlet 230 is arranged to the housing 210 for dispensing reactant to the first direction flow in the inner cavity 253, the reactant configured to mix with the exhaust gas flow. A second flow guide 261 is located downstream from the first flow guide 210, and the second flow guide 261 is configured to: guide at least a part of the first direction flow to a second direction to form a second direction flow, wherein the second direction being different to the first direction.

In an embodiment, a first flow guide 251 in the inner cavity 253 is configured to form, using the exhaust gas flow, a center flow and an edge flow circulating and advancing around the center flow in a first direction; a reactant inlet 230 is arranged to the housing 210 for dispensing reactant to the center flow in the inner cavity, and the reactant is configured to mix with the exhaust gas flow.

In an embodiment, a first flow guide comprises at least one of the following: an inner surface of the housing 210 configured to define the inner cavity 253; a curved flow guide (710-720 in FIGS. 7-8) and a perforated tubular element 251, wherein at least part of the input exhaust is configured to enter an interior of the perforated tubular element 251 through apertures.

The inner surface of the housing 210 configured to define the inner cavity 253 may be formed in such a way that it causes the exhaust gas to flow and/or rotate in a first direction.

The perforated tubular element 251 may be formed and placed in such a way that it causes the exhaust gas to flow and/or rotate in a first direction.

Furthermore, a combination of any of the inner surface of the housing 210 configured to define the inner cavity 253; the curved flow guide; and the perforated tubular element 251 may be used to guide the exhaust flow to a first direction.

In an embodiment, no matter the inner cavity 253 is pointed in FIG. 3 to locate only within the mixer unit 250, in different embodiments disclosed the inner cavity 253 may comprise any inner cavity within the mixer unit 253, the solid tubular element 252, and the mixing device 260, or their combination. Similarly, no matter the housing 210 is labeled for the mixer unit 250 in FIG. 3, the housing 210 may comprise any housing of the mixer unit 253, the solid tubular element 252, and the mixing device 260, or their combination.

Figure 12A:
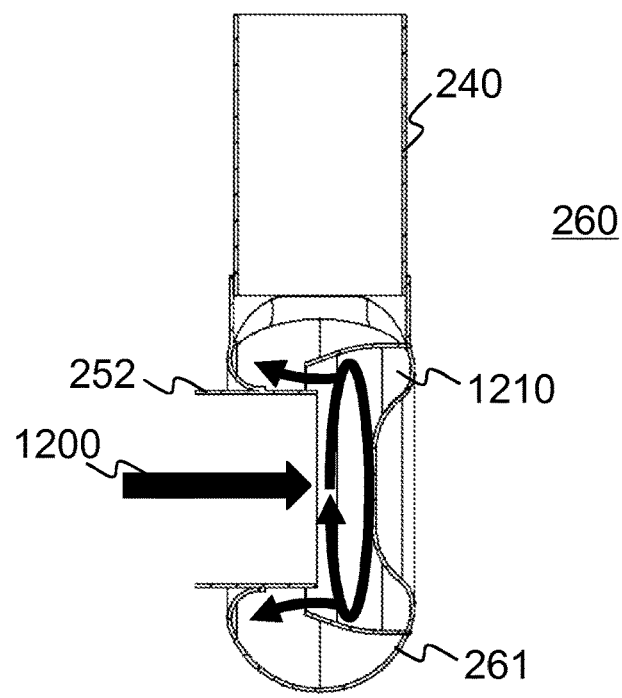
FIGS. 12*a-b* show schematic pictures of a mixing device comprising a further flow guide according to another alternative embodiment of the present disclosure.
Figure 12B:
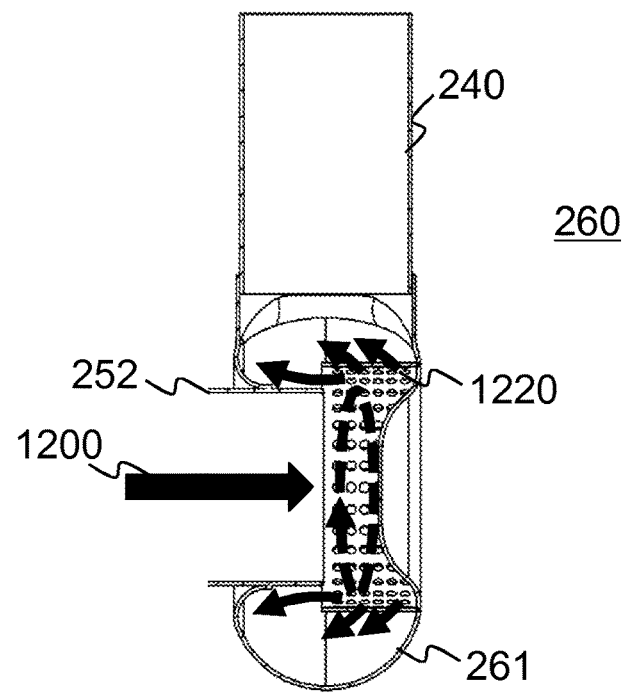

In an embodiment, a toroidal cylinder 261 may comprise a further flow guide (not shown) within the cylinder 261 inner cavity. The further flow guide may comprise, for example, a solid flow guide extending the flow path of the exhaust gas, or a perforated flow guide improving the mixing of the exhaust gas and the reactant. FIGS. 12a-b illustrate such embodiments further.

Figure 4:
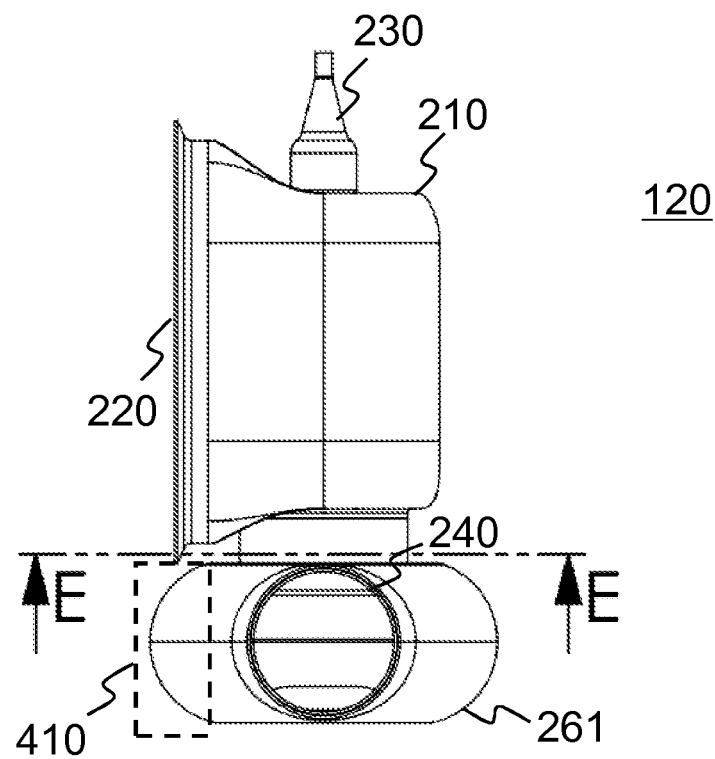
FIG. 4 shows a schematic picture of an exhaust gas aftertreatment apparatus according to an example embodiment of the present disclosure illustrating the cross-sectional view E-E.

FIG. 4 shows a schematic picture of an exhaust gas aftertreatment apparatus 120 according to an example embodiment of the invention. The apparatus 120 for aftertreatment of exhaust gas is viewed from above and comprises a housing 210, an exhaust inlet 220, a reactant inlet 230, and an exhaust outlet 240. Plane E-E illustrates cross-sectional view used in FIG. 5.

The perforated tubular element 251 shown in FIG. 3 is not visible since located in the inner cavity defined by internal walls of the housing 210.

In an embodiment, a mixing device may comprise a toroidal cylinder 261 comprising a poloidal angle that causes the toroidal cylinder 261 to have a poloidal round shape 410, as illustrated in FIG. 4. Such embodiment may be described as a "donut" toroidal cylinder 261.

In an embodiment, a mixing device may comprise a toroidal cylinder 261 comprising no or minimal poloidal angle to cause the toroidal cylinder 261 to have an annular ring shape (not shown in FIG. 4). Such embodiment may be described as a "pineapple ring" toroidal cylinder 261.

In an embodiment, a mixing device may comprise a combination of the "donut" and the "pineapple ring" toroidal cylinders 261, wherein one of the inner and the outer diameters of the toroidal cylinder 261 comprises a poloidal angle to cause the toroidal cylinder 261 to have a poloidal round shape 410, as illustrated in FIG. 4, and the other diameter to have an annular ring shape.

Figure 5:
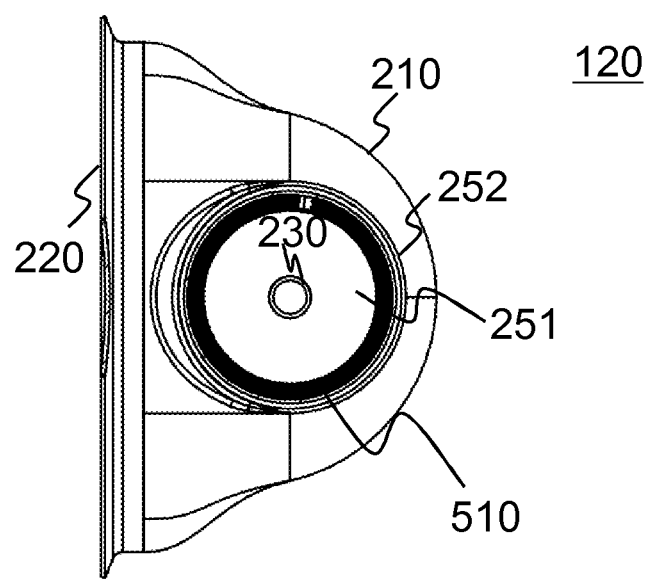
FIG. 5 shows a schematic picture of an exhaust gas aftertreatment apparatus according to an example embodiment of the present disclosure illustrating the plane E-E.

FIG. 5 shows a schematic picture of an exhaust gas aftertreatment apparatus 120 according to an example embodiment of the invention illustrating the cross-sectional view E-E of FIG. 4.

FIG. 5 illustrates a view from the direction of the mixing device towards the mixer unit and the apparatus 120 for aftertreatment of exhaust gas comprises a housing 210 and an exhaust inlet 220. A reactant inlet 230 is shown in the opposite end of a perforated tubular element 251. A solid tubular element, 252 may be provided to connect the mixer unit and the mixing device, wherein the solid tubular element 252 and a perforated tubular element 251 are attached to the housing and guide gas flow in the inner cavity defined by the housing. An exhaust gas flow comprises a center flow advancing inside the perforated tubular element 251 and an edge flow advancing through a gap 510 between the perforated tubular element 251 and the solid tubular element 252. Plane E-E illustrates cross-section defined in FIG. 4. The gap 510 is also illustrated in FIG. 6.

Figure 6:
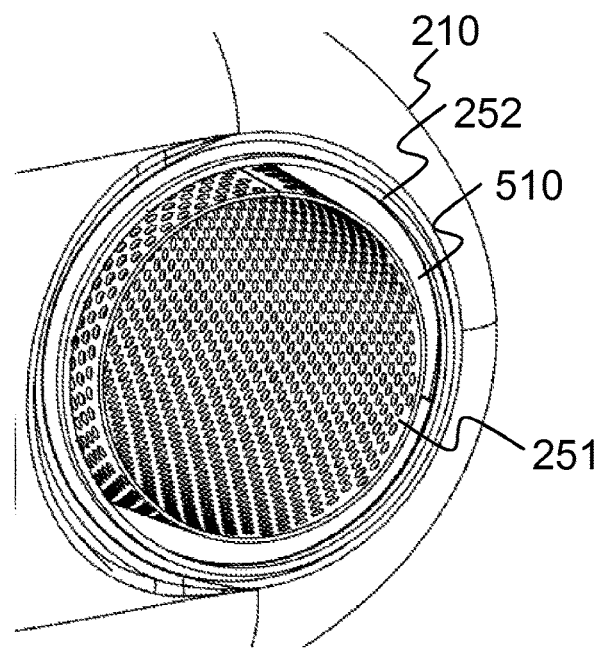
FIG. 6 shows a schematic picture of a gap between a perforated tubular element and a solid tubular element according to an example embodiment of the present disclosure.

FIG. 6 shows a schematic picture of a gap 510 between a perforated tubular element 251 and a solid tubular element 252 according to an example embodiment of the invention. An open end of the perforated tubular element 251 may be supported by support elements (not shown) connected between an outer surface of the perforated tubular element 251 and an inner surface of the solid tubular element 252, for example. The support elements do not block the gap 510, however, and the exhaust gas flow is allowed to pass through the gap 510.

A housing 210 comprises an inner cavity, wherein a perforated tubular element 251. A solid tubular element 252 may be provided to connect the mixer unit and the mixing device, wherein the solid tubular element 252 and a perforated tubular element 251 are attached to the housing and guide gas flow in the inner cavity defined by the housing. An exhaust gas flow comprises a center flow advancing inside the perforated tubular element 251 and an edge flow advancing through a gap 510 between the perforated tubular element 251 and the solid tubular element 252 (shortened in FIG. 6 to illustrate the gap 510).

Figure 7:
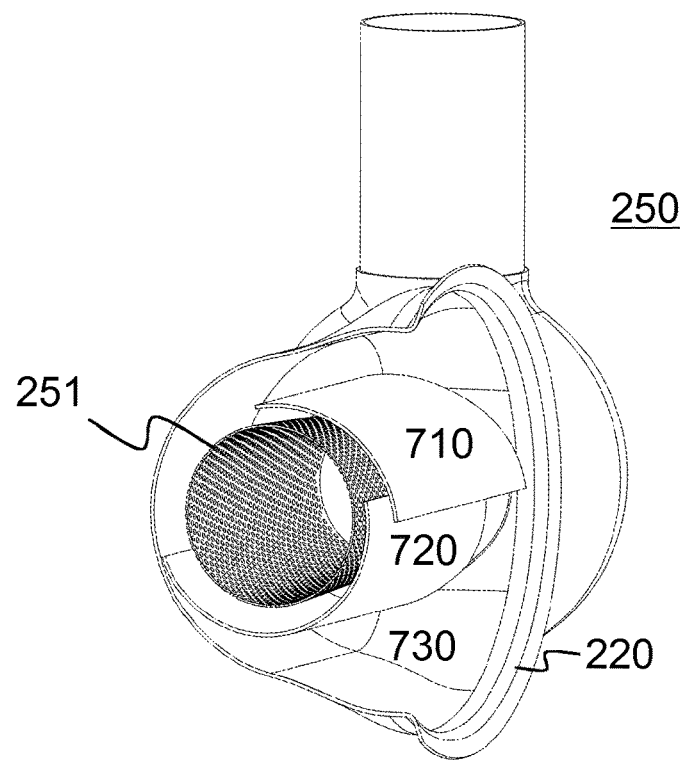
FIG. 7 shows a schematic picture of a mixer unit of an exhaust gas aftertreatment apparatus according to an example embodiment of the present disclosure.

FIG. 7 shows a schematic picture of a mixer unit 250 of an exhaust gas aftertreatment apparatus according to an example embodiment of the present disclosure.

In an embodiment, the mixer unit 250 comprises a first curved flow guide 710 and a second curved flow guide 720 extending across the exhaust inlet 220 in an inner cavity 730 for steering the entering exhaust gas flow in the inner cavity 730 to form a first flow path and a second flow path from the exhaust inlet 220 circulating a perforated tubular element 251.

In an embodiment, the first curved flow guide 710 and the second curved flow guide 720 may be used to implement a mixer unit 250 with or without a mixing device 260 of FIG. 3.

Figure 8:
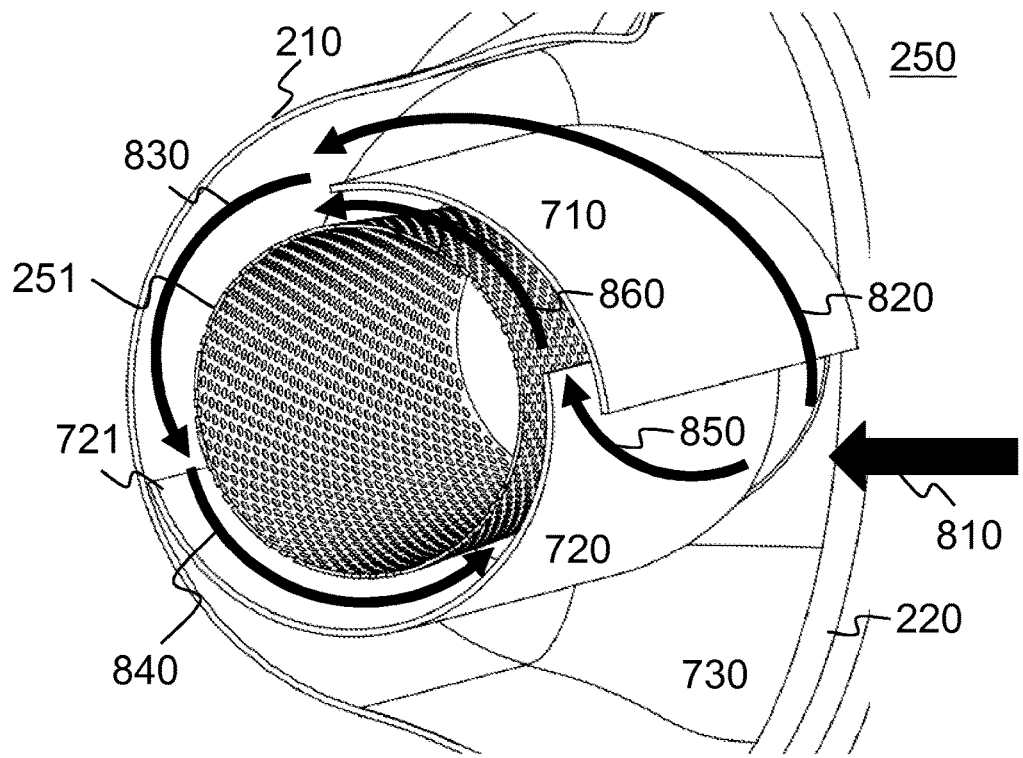
FIG. 8 shows a schematic picture of a mixer unit and flow paths, according to an example embodiment of the present disclosure.

FIG. 8 shows a schematic picture of a mixer unit 250 and flow paths, according to an example embodiment of the present disclosure.

In an embodiment, an exhaust gas flow 810 is entering an inner cavity 730 defined by a housing 210 of the mixer unit 250 via an exhaust inlet 220. A portion of the entering gas flow 810 enters a first flow path 820-840, wherein the first flow path comprises a first part 820 between an outer wall of the first curved flow guide 710 and an inner wall of the housing 210 configured to define the inner cavity 730; a second part 830 between the inner wall of the housing configured to define the inner cavity and the perforated tubular element 251; and a third part 840 between an inner wall of the second curved flow guide 720 and the perforated tubular element 251. A portion of the entering gas flow 810 enters a second flow path 850-860, 830-840, wherein the second flow path comprises a first part 850 between an outer wall of the second curved flow guide 720 and an inner wall of the first curved flow guide 710; a second part 860 between the inner wall of the first curved flow guide 710 and the perforated tubular element 251; a third part 830 between the inner wall of the housing 210 configured to define the inner cavity 730 and the perforated tubular element 251; and a fourth part 840 between an inner wall of the second curved flow guide 720 and the perforated tubular element 251.

In an embodiment, the first curved flow guide 710 extends from the exhaust inlet 220 in the inner cavity 730 to a first direction around the perforated tubular element 251; and the second curved flow guide 720 extends from the exhaust inlet in the inner cavity to a second direction around the perforated tubular element, as shown in FIG. 8. Upstream ends of the first curved flow guide and the second curved flow guide that are adjacent to the exhaust inlet are at least partially overlapping to provide a gap between the curved flow guides for the first part 850 of the second flow path 850-860, 830-840.

In an embodiment, the second curved flow guide 720 is longer than the first curved flow guide 710.

In an embodiment, directions of a first flow path 820-840 and a second flow path 850-860, 830-840 may be defined by arranging the flow guides 710-720 appropriately to direct the flows in desired direction around the perforated tubular element 251.

In an embodiment, an upstream end of the second curved flow guide is adjacent to the exhaust inlet 220, wherein a downstream end 721 of the second curved flow guide 720 is connected to the inner wall of the housing 210 configured to define the inner cavity.

Figure 9:
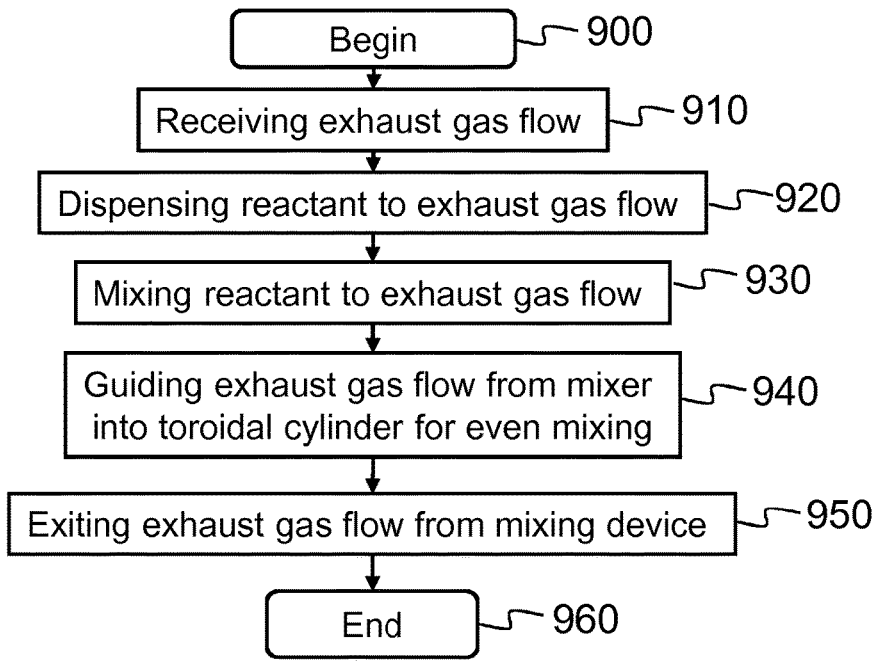
FIG. 9 shows a flow diagram showing operations in accordance with an example embodiment of the present disclosure.

FIG. 9 shows a flow diagram showing operations in accordance with an example embodiment of the invention. In step 900, the method for aftertreatment of exhaust gas is started. In step 910, an exhaust gas flow is received to an inner cavity of a housing via an exhaust inlet. In step 920, a reactant is dispensed to the exhaust gas flow by a mixer unit arranged in the inner cavity. In step 930, the reactant is mixed to the exhaust gas flow by a mixing device located downstream of the mixer unit. In step 940, the exhaust gas flow is guided from the mixer unit via a solid tubular element into a toroidal cylinder to swirl inside the toroidal cylinder and to evenly mix, wherein the solid tubular element being arranged in a centric manner to a first base of the toroidal cylinder. In step 950, the exhaust gas flow is exited from the mixing device via an exhaust outlet arranged to a curved side of the toroidal cylinder. In step 960, the method ends.

Figure 10A:
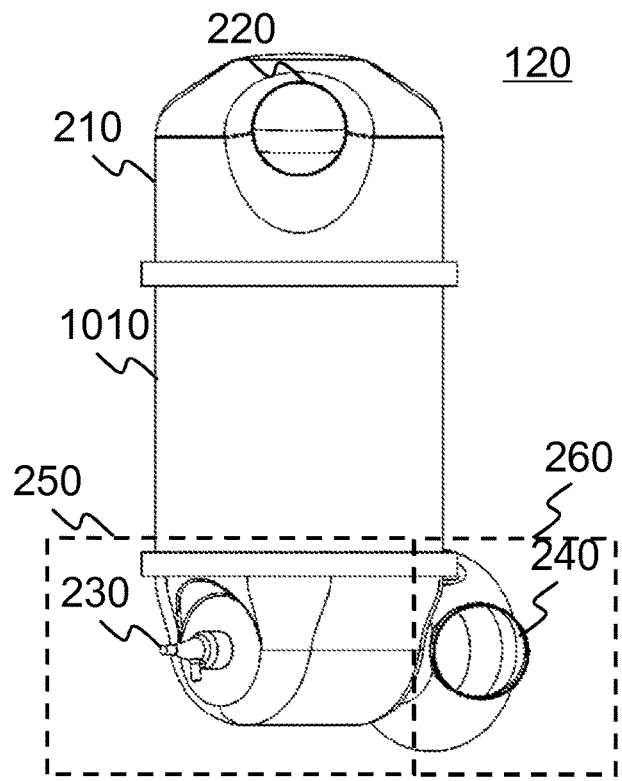
FIGS. 10*a-b* show schematic pictures of an exhaust gas aftertreatment apparatus according to an alternative embodiment of the present disclosure.
Figure 10B:
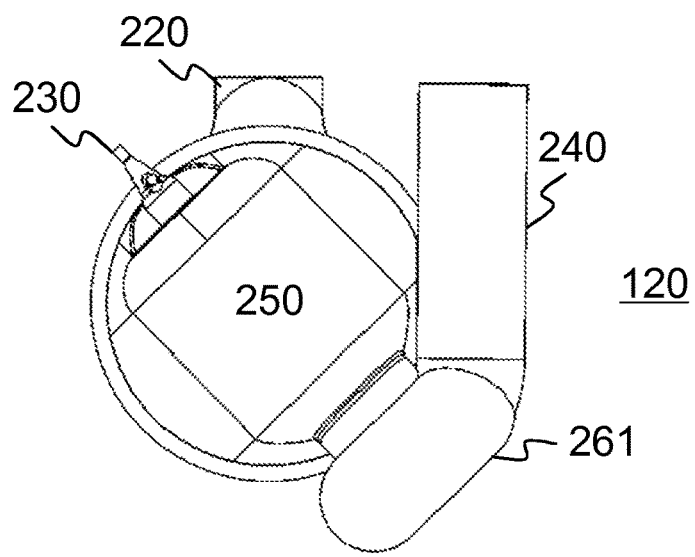

FIGS. 10a-b show schematic pictures of an exhaust gas aftertreatment apparatus 120 according to an alternative embodiment of the present disclosure.

The apparatus 120 for aftertreatment of exhaust gas comprises a housing 210, an exhaust inlet 220, a reactant inlet 230, and an exhaust outlet 240.

In an embodiment, the reactant inlet 230 comprises a nozzle, as shown in FIG. 10a.

The exhaust inlet 220 is arranged to the housing 210 for entering input exhaust gas to the apparatus 120. The reactant inlet 230 is arranged to the housing 210 for dispensing reactant to the apparatus 120, and the reactant is configured to mix with the input exhaust gas to provide mixed exhaust gas. The exhaust outlet 240 is arranged to the housing 210 for exiting output exhaust gas from the apparatus 120. Furthermore, the apparatus 120 may comprise, for example, attachment elements for attaching the apparatus 120 to an engine system or a chassis of a vehicle. The exhaust outlet 240 may comprise an outlet duct.

In an embodiment, the apparatus 120 comprises a mixer unit 250 and a mixing device 260, as illustrated in FIG. 10a using dashed lines. The mixing device 260, located downstream to the mixer unit 250, receives the exhaust gas mixed with the reactant, and provides evenly mixing of those with reduced apparatus size. A connecting tube may be provided to connect the mixer unit 250 and the mixing device 260.

In an embodiment, a diesel oxidation catalyst (DOC) substrate 1010 is placed downstream to the exhaust inlet 220, and upstream to the reactant inlet 230.

In an embodiment, a selective catalytic reduction (SCR) substrate (not shown) is placed downstream to the exhaust gas outlet 240.

In an embodiment, the SCR substrate may also comprise a diesel particulate filter (DPF) for particulate matter reduction.

In an embodiment, a housing 210 is configured to define at least one inner cavity, wherein the exhaust gas is aftertreated by the apparatus 120. An exhaust inlet 220 is arranged to the housing 210 for entering input exhaust gas to the inner cavity. The exhaust gas may travel through DOC substrate 1010 within the inner cavity before reaching a mixer unit 250.

In an embodiment, the exhaust inlet 220 and the diesel oxidation catalyst (DOC) substrate 1010 are arranged in different angle in relation to the mixer unit 250. As can be seen from FIG. 10a, an angled arrangement of the mixer unit 250 (direction of dispensing the reactant from the reactant inlet 230) and the exhaust inlet 220 is provided when the mixer unit 250 and the DOC 1010 are located in different housing parts. Thus any angle between the mixer unit 250 and the DOC 1010 may be arranged. As can be seen in FIG. 10a, the angle is different angle in relation to each other than in the embodiment of FIG. 3. In FIG. 3 the relation is substantially perpendicular. As can be seen from FIG. 10a, an angled arrangement of the mixer unit 250 and the exhaust outlet 240 is provided. Thus a non-perpendicular angle between the mixer unit 250 and the exhaust outlet may be arranged.

The angled arrangement of FIG. 10a is further illustrated in FIG. 10b from a different angle. The mixer unit 250 is arranged in angled position compared to the exhaust inlet 220. Furthermore, the exhaust outlet 240 is arranged in angled position compared to the toroidal cylinder 261 of the mixing device. Such angled positions provide further advantages, such as more flexible installation of the exhaust gas aftertreatment apparatus 120 to an engine system and shorter connecting tube because the mixer unit 250 and the mixing device 260 can be connected closer to each other.

Figure 11A:
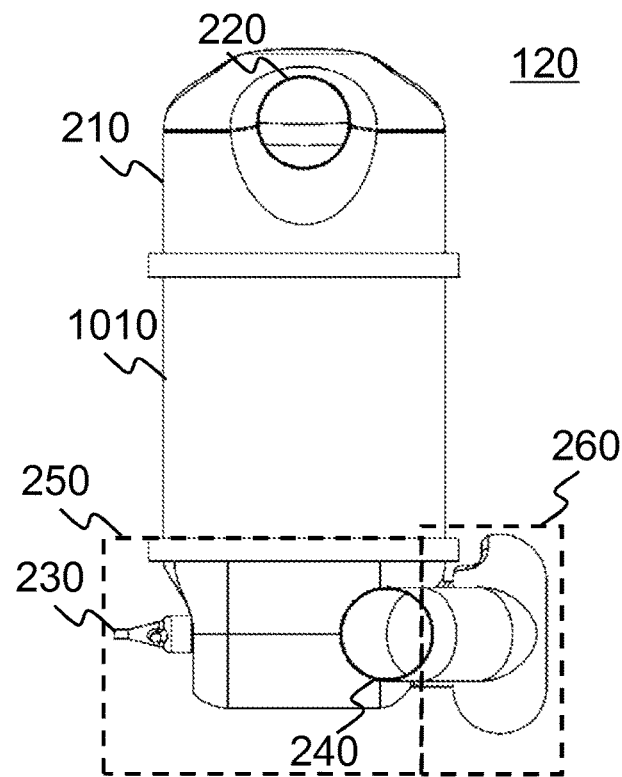
FIGS. 11*a-b* show schematic pictures of an exhaust gas aftertreatment apparatus according to another alternative embodiment of the present disclosure.
Figure 11B:
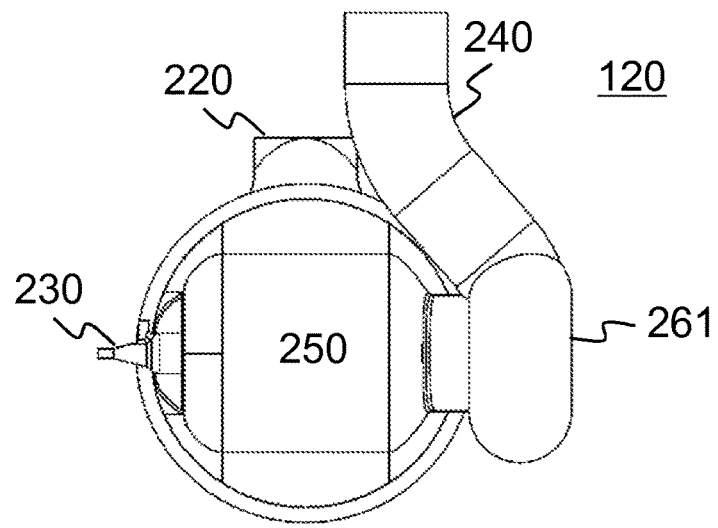

FIGS. 11a-b show schematic pictures of an exhaust gas aftertreatment apparatus 120 according to another alternative embodiment of the present disclosure.

The apparatus 120 for aftertreatment of exhaust gas comprises a housing 210, an exhaust inlet 220, a reactant inlet 230, and an exhaust outlet 240.

In an embodiment, the reactant inlet 230 comprises a nozzle, as shown in FIG. 11a.

The exhaust inlet 220 is arranged to the housing 210 for entering input exhaust gas to the apparatus 120. The reactant inlet 230 is arranged to the housing 210 for dispensing reactant to the apparatus 120, and the reactant is configured to mix with the input exhaust gas to provide mixed exhaust gas. The exhaust outlet 240 is arranged to the housing 210 for exiting output exhaust gas from the apparatus 120. Furthermore, the apparatus 120 may comprise, for example, attachment elements for attaching the apparatus 120 to an engine system or a chassis of a vehicle. The exhaust outlet 240 may comprise an outlet duct.

In an embodiment, the apparatus 120 comprises a mixer unit 250 and a mixing device 260, as illustrated in FIG. 11a using dashed lines. The mixing device 260, located downstream to the mixer unit 250, receives the exhaust gas mixed with the reactant, and provides evenly mixing of those with reduced apparatus size. A connecting tube may be provided to connect the mixer unit 250 and the mixing device 260.

In an embodiment, a diesel oxidation catalyst (DOC) substrate 1010 is placed within a housing 210 downstream to the exhaust inlet 220, and upstream to the reactant inlet 230.

In an embodiment, a diesel particulate filter (DPF) 1010 is arranged instead of a diesel oxidation catalyst (DOC) substrate for particulate matter reduction. Alternatively, a diesel oxidation catalyst (DOC) substrate may be combined to the diesel particulate filter (DPF) 1010.

In an embodiment, a selective catalytic reduction (SCR) substrate (not shown) is placed downstream to the exhaust gas outlet 240.

In an embodiment, the SCR substrate may also comprise a diesel particulate filter (DPF) for particulate matter reduction.

In an embodiment, a housing 210 is configured to define at least one inner cavity, wherein the exhaust gas is aftertreated by the apparatus 120. An exhaust inlet 220 is arranged to the housing 210 for entering input exhaust gas to the inner cavity. The exhaust gas may travel through DOC substrate 1010 within the inner cavity before reaching a mixer unit 250.

In an embodiment, the exhaust inlet 220 and the diesel oxidation catalyst (DOC) substrate 1010 are arranged in an angle in relation to the mixer unit 250. As can be seen from FIG. 11a, an angled arrangement of the mixer unit 250 (direction of dispensing the reactant from the reactant inlet 230) and the exhaust inlet 220 is provided when the mixer unit 250 and the DOC 1010 are located in different housing parts. Thus any angle between the mixer unit 250 and the DOC 1010 may be arranged. As can be seen from FIG. 11a, an angled arrangement of the mixer unit 250 and the exhaust outlet 240 is provided.

The angled arrangement of FIG. 11a is further illustrated in FIG. 11b from a different angle. The mixer unit 250 is arranged in angled position compared to the exhaust inlet 220. Furthermore, the exhaust outlet 240 comprises an angled duct that is arranged in angled position compared to the toroidal cylinder 261 of the mixing device. Such angled duct provide further advantages, such as more flexible installation of the exhaust gas aftertreatment apparatus 120 to an engine system and shorter connecting tube because the mixer unit 250 and the mixing device 260 can be connected closer to each other.

Typically, dispensing the reactant from the reactant inlet 230 in upwards direction is not allowed. However, it would be beneficial in some engine system installations if flow path could be directed upwards after a diesel particulate filter (DPF). When the exhaust outlet 240 is arranged to the toroidal cylinder 261 of the mixing device, such combination provide further advantages, such as more flexible installation of the exhaust gas aftertreatment apparatus 120 to an engine system in less space and shorter connecting tube. Furthermore, steeper angles within the flow path can be avoided when using the toroidal cylinder 261 of the mixing device and a curved exhaust outlet 240.

FIGS. 12a-b show schematic pictures of a mixing device comprising a further flow guide according to another alternative embodiments of the present disclosure.

The mixing device 260 comprises a toroidal cylinder 261 configured to receive the exhaust gas flow from the mixer unit via a solid tubular element 252, wherein the solid tubular element being arranged to a first base of the toroidal cylinder for guiding the exhaust gas flow led into the toroidal cylinder to swirl inside the toroidal cylinder.

In an embodiment, a toroidal cylinder 261 may comprise a further flow guide 1210 within the cylinder 261 inner cavity. The further flow guide 1210 may comprise, for example, a solid cup-shaped flow guide 1210 extending the flow path of the exhaust gas, as illustrated in FIG. 12a. The entering exhaust gas flow 1200 may first swirl inside the flow guide 1210 until exiting the flow guide 1210 through a gap between the open end of the flow guide 1210 and the solid tubular element 252, as illustrated by arrows in FIG. 12a. After exiting the flow guide 1210, the exhaust gas flow may swirl inside the toroidal cylinder 261 before exiting from the mixing device 260 via an exhaust outlet 240 arranged to a side of the toroidal cylinder 261.

In an embodiment, a toroidal cylinder 261 may comprise a further flow guide 1220 within the cylinder 261 inner cavity. The further flow guide 1220 may comprise, for example, a perforated tubular flow guide 1220 extending the flow path of the exhaust gas and improving the mixing of the exhaust gas and the reactant, as illustrated in FIG. 12b. The entering exhaust gas flow 1200 may swirl inside the flow guide 1220 until exiting the flow guide 1220 through a gap between the open end of the flow guide 1220 and the solid tubular element 252 or the holes of the perforated tubular flow guide 1220, as illustrated by arrows in FIG. 12b. After exiting the flow guide 1220, the exhaust gas flow may swirl inside the toroidal cylinder 261 before exiting from the mixing device 260 via an exhaust outlet 240 arranged to a side of the toroidal cylinder 261.

In an embodiment, a perforated tubular element 251 (see e.g. FIG. 3) reduces turbulence of an exhaust gas entering the interior of the perforated tubular element 251. The exhaust gas entering the interior of the perforated tubular element 251 forms a center flow, wherein the reactive substance is fed. Reducing the turbulence in the interior of the perforated tubular element 251 results in that the center flow and the edge flow remain apart from each other in the beginning of a mixing procedure, whereby the reactive substance fed into the center flow does not come into contact with a wall of the inner cavity before it is converted to ammonia, for example.

The perforated tubular element 251 reduces formation of solid deposit generated in the conversion process of urea (or some other reactant) in the inner cavity and thus reduces the service need of the apparatus and the engine system. Furthermore, the engine system retains its operational ability and efficiency better.

In an embodiment, not only the size of the mixing apparatus may be reduced but also the shape may be more freely designed. Since the deposit risk of the urea also in the bends of the housing 210 is reduced, the designing of the aftertreatment apparatus 120 becomes easier.

Some of the advantages provided by embodiments of the invention comprise at least one of the following. First, a length of a mixing flow channel is increased without increasing the size of the apparatus too much. Second, the mixing flow channel diameter may be increased. Third, there is no dedicated reactant (e.g. ammonia or urea) concentration point within the inner cavity or flow channel that would increase risk of urea deposits in exhaust pipelines. Fourth, a width of the mixing apparatus is reduced since the toroidal cylinder 261 may be squeezed to narrower width W than state of the art solutions. Fifth, direction of the exhaust outlet 240 may be freely selected to ease the placement of the apparatus 120 to an engine system. Sixth, angle of the exhaust outlet 240 may be adjusted to ease the placement of the apparatus 120 to an engine system.

Various embodiments have been presented. It should be appreciated that in this document, words comprise, include and contain are each used as open-ended expressions with no intended exclusivity. If desired, the different functions discussed herein may be performed in a different order and/or concurrently with each other. Furthermore, if desired, one or more of the above-described functions may be optional or may be combined. Although various aspects of the present disclosure are set out in the independent claims, other aspects of the present disclosure comprise other combinations of features from the described embodiments and/or the dependent claims with the features of the independent claims, and not solely the combinations explicitly set out in the claims.

The foregoing description has provided by way of non-limiting examples of particular implementations and embodiments of the present disclosure a full and informative description of the best mode presently contemplated by the inventors for carrying out the invention. It is however clear to a person skilled in the art that the present disclosure is not restricted to details of the embodiments presented above, but that it can be implemented in other embodiments using equivalent means or in different combinations of embodiments without deviating from the characteristics of the present disclosure.

Furthermore, some of the features of the above-disclosed embodiments of this invention may be used to advantage without the corresponding use of other features. As such, the foregoing description shall be considered as merely illustrative of the principles of the present disclosure, and not in limitation thereof. Hence, the scope of the present disclosure is only restricted by the appended patent claims.

The invention claimed is:

1. An apparatus for aftertreatment of exhaust gas comprising:
   a housing configured to define an inner cavity;
   an exhaust inlet arranged to the housing for entering exhaust gas flow to the inner cavity;
   a mixer unit arranged in the inner cavity configured to dispense a reactant to the exhaust gas flow, wherein the mixer unit further comprising a perforated tubular element configured to assist the exhaust gas flow to circulating and advancing movement in a first direction within the inner cavity, wherein at least part of the exhaust gas flow is configured to enter an interior of the perforated tubular element through apertures;
   wherein the apparatus further comprises:
   a first curved flow guide and a second curved flow guide in the inner cavity for steering the entering exhaust gas flow in the inner cavity to form a first flow path and a second flow path from the exhaust inlet circulating the perforated tubular element, wherein
   the first flow path comprises:
      a first part between an outer wall of the first curved flow guide and an inner wall of the housing configured to define the inner cavity;
      a second part between the inner wall of the housing configured to define the inner cavity and the perforated tubular element; and
      a third part between an inner wall of the second curved flow guide and the perforated tubular element; and
   the second flow path comprises:
      a first part between an outer wall of the second curved flow guide and an inner wall of the first curved flow guide;
      a second part between the inner wall of the first curved flow guide and the perforated tubular element;
      a third part between the inner wall of the housing configured to define the inner cavity and the perforated tubular element; and
      a fourth part between an inner wall of the second curved flow guide and the perforated tubular element.

2. The apparatus of claim 1, further comprising at least one of the following:
   a diesel particulate filter (DPF) for receiving exhaust gas, located upstream of the mixer unit; and
   a selective catalytic reduction (SCR) substrate, located downstream of the mixing device.

3. The apparatus of claim 1, further comprising:
   a solid tubular element located downstream to the perforated tubular element;
   a mixing device to receive gas flow from the mixer unit via the solid tubular element, configured to evenly mix the reactant to the exhaust gas flow, the mixing device comprising a toroidal cylinder configured to receive the exhaust gas flow from the mixer unit via a solid tubular element, wherein the solid tubular element being arranged in a centric manner to a first base of the toroidal cylinder for guiding the exhaust gas flow led into the toroidal cylinder to swirl inside the toroidal cylinder; and
   an exhaust outlet arranged to a curved side of the toroidal cylinder, configured to exit the exhaust gas flow from the mixing device.

4. The apparatus of claim 3, wherein a width from the first base to a second base of the toroidal cylinder is smaller than a diameter of the toroidal cylinder.

5. The apparatus of claim 4, wherein the second base of the toroidal cylinder is bent inwards.

6. The apparatus of claim 4, wherein a diameter of the exhaust outlet being equal to the maximum width from the first base to the second base of the toroidal cylinder.

7. The apparatus of claim 3, wherein the solid tubular element is configured to guide the exhaust gas into the toroidal cylinder in a horizontal direction and the exhaust outlet is configured to exit the exhaust gas flow from the mixing device in a vertical direction.

8. The apparatus of claim 3, wherein the solid tubular element guiding the exhaust gas into the toroidal cylinder is configured to extend partially inside the toroidal cylinder.

9. The apparatus of claim 3, wherein the solid tubular element is configured to guide the circulating and advancing exhaust gas flow in the first direction from the mixer unit towards the mixing device, wherein a diameter of the solid tubular element being greater than a diameter of a downstream end of the perforated tubular element allowing a part of the circulating and advancing exhaust gas flow around the perforated tubular element to enter the solid tubular element.

10. The apparatus of claim 3, wherein the toroidal cylinder comprising a poloidal angle configured to cause the toroidal cylinder to have a poloidal round shape.

11. The apparatus of claim 10, wherein the toroidal cylinder comprising no poloidal angle configured to cause the toroidal cylinder to have an annular ring shape.

12. The apparatus of claim 10, wherein the toroidal cylinder comprising a further flow guide within an inner cavity of the toroidal cylinder.

13. The apparatus of claim 12, wherein the further flow guide comprising a solid cup-shaped flow guide configured to extend a flow path of the exhaust gas flow.

14. The apparatus of claim 13, wherein the exhaust gas flow is configured to swirl inside the solid cup-shaped flow guide until exiting the solid cup-shaped flow guide through a gap between an open end of the solid cup-shaped flow guide and the solid tubular element.

15. The apparatus of claim 14, wherein after exiting the solid cup-shaped flow guide, the exhaust gas flow is configured to swirl inside the toroidal cylinder before exiting from the mixing device via the exhaust outlet.

16. The apparatus of claim 13, wherein the further flow guide comprising a perforated tubular flow guide configured to extend a flow path of the exhaust gas flow and to improve mixing of the exhaust gas with the reactant.

17. The apparatus of claim 16, wherein the exhaust gas flow is configured to swirl inside the perforated tubular flow guide until exiting the perforated tubular flow guide through a gap between the open end of the perforated tubular flow guide and the solid tubular element or through holes of the perforated tubular flow guide.

18. The apparatus of claim 17, wherein after exiting the perforated tubular flow guide, the exhaust gas flow is configured to swirl inside the toroidal cylinder before exiting from the mixing device via the exhaust outlet.

19. The apparatus of claim 1, wherein the first curved flow guide extends from the exhaust inlet in the inner cavity to a first direction around the perforated tubular element; and the second curved flow guide extends from the exhaust inlet in the inner cavity to a second direction around the perforated tubular element; and wherein upstream ends of the first curved flow guide and the second curved flow guide adjacent to the exhaust inlet are at least partially overlapping to provide a gap between the curved flow guides for the first part of the second flow path.

20. The apparatus of claim 19, wherein the second curved flow guide is longer than the first curved flow guide.

21. The apparatus of claim 1, wherein an upstream end of the second curved flow guide is adjacent to the exhaust inlet and a downstream end of the second curved flow guide is connected to the inner wall of the housing configured to define the inner cavity.

22. A method for aftertreatment of exhaust gas comprising:
   receiving exhaust gas flow to an inner cavity of a housing via an exhaust inlet;
   dispensing a reactant to the exhaust gas flow by a mixer unit arranged in the inner cavity, wherein the mixer unit further comprising a perforated tubular element configured to assist the exhaust gas flow to circulating and advancing movement in a first direction within the inner cavity, wherein at least part of the exhaust gas flow is configured to enter an interior of the perforated tubular element through apertures;
   wherein the method further comprises:
   guiding by a first curved flow guide and a second curved flow guide in the inner cavity for steering the entering exhaust gas flow in the inner cavity to form a first flow path and a second flow path from the exhaust inlet circulating the perforated tubular element, wherein
   the first flow path comprises:
      a first part between an outer wall of the first curved flow guide and an inner wall of the housing configured to define the inner cavity;
      a second part between the inner wall of the housing configured to define the inner cavity and the perforated tubular element; and
      a third part between an inner wall of the second curved flow guide and the perforated tubular element; and
   the second flow path comprises:
      a first part between an outer wall of the second curved flow guide and an inner wall of the first curved flow guide;
      a second part between the inner wall of the first curved flow guide and the perforated tubular element;
      a third part between the inner wall of the housing configured to define the inner cavity and the perforated tubular element; and
      a fourth part between an inner wall of the second curved flow guide and the perforated tubular element.

* * * * *